United States Patent
Tetzlaff et al.

(10) Patent No.: US 9,307,056 B2
(45) Date of Patent: Apr. 5, 2016

(54) METHODS, SYSTEMS AND APPARATUSES FOR DIRECT DATA FRAMES

(75) Inventors: Thomas A. Tetzlaff, Hillsboro, OR (US); Minyoung Park, Portland, OR (US); Emily H. Qi, Camas, WA (US); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 13/977,710

(22) PCT Filed: Apr. 24, 2012

(86) PCT No.: PCT/US2012/034813
§ 371 (c)(1),
(2), (4) Date: Mar. 19, 2014

(87) PCT Pub. No.: WO2013/162522
PCT Pub. Date: Oct. 31, 2013

(65) Prior Publication Data
US 2014/0192823 A1 Jul. 10, 2014

(51) Int. Cl.
*H04L 1/00* (2006.01)
*H04L 29/06* (2006.01)
*H04L 29/08* (2006.01)

(52) U.S. Cl.
CPC ............... *H04L 69/22* (2013.01); *H04L 69/04* (2013.01); *H04L 69/324* (2013.01)

(58) Field of Classification Search
None
See application file for complete search history.

(56) References Cited

U.S. PATENT DOCUMENTS

| 7,680,230 | B2 | 3/2010 | Koppelaar et al. | |
|---|---|---|---|---|
| 8,031,806 | B2 | 10/2011 | Trachewsky et al. | |
| 2010/0061402 | A1 | 3/2010 | Van Zelst et al. | |
| 2011/0142176 | A1 | 6/2011 | Yokokawa et al. | |
| 2013/0155929 | A1* | 6/2013 | Aboul-Magd et al. | 370/311 |
| 2013/0215751 | A1* | 8/2013 | Tetzlaff | 370/235 |
| 2014/0198805 | A1* | 7/2014 | Qi et al. | 370/474 |

FOREIGN PATENT DOCUMENTS

WO  2013/162522 A1  10/2013

OTHER PUBLICATIONS

International Preliminary Report on Patentability and Written Opinion received for PCT Patent Application No. PCT/US2012/034813 mailed on Nov. 6, 2014, 6 pages.
International Search Report and Written Opinion received for PCT Patent Application No. PCT/US2012/034813, mailed on Dec. 20, 2012, 12 pages.

* cited by examiner

*Primary Examiner* — Frank Duong
(74) *Attorney, Agent, or Firm* — Schubert Law Group PLLC (57) ABSTRACT

Generally, arrangements for enabling direct medium access control (MAC) sublayer data frames are described herein. Embodiments may comprise logic such as hardware and/or code to reduce the size of a packet by determining a frame in the MAC sublayer, inserting the frame in the signal field of a preamble to transmit, transmitting the direct MAC data frame as a packet, communicating that the packet is a direct MAC data frame, and parsing and interpreting the direct MAC data frame at the receiving device. Embodiments may determine and transmit and/or receive and interpret direct MAC data frames.

23 Claims, 5 Drawing Sheets

METHODS, SYSTEMS AND APPARATUSES FOR DIRECT DATA FRAMES

BACKGROUND

The present disclosure relates generally to the field of wireless communications technologies. More particularly, the present disclosure relates to insertion of medium access control (MAC) sublayer frames, referred to as direct MAC data, in a preamble of a packet.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Generally, arrangements for enabling the direct insertion of medium access control (MAC) sublayer frames, referred to as direct MAC data, in a preamble of a packet, referred to as a direct MAC data frame, is described herein. Embodiments may comprise logic such as hardware and/or code to reduce the size of a packet by determining direct MAC data in the MAC sublayer, inserting the direct MAC data in the signal field of a preamble, transmitting the direct MAC data frame as a packet, communicating that the packet is a direct MAC data frame, and parsing and interpreting the direct MAC data frame at the receiving device. Embodiments may determine and transmit and/or receive and interpret direct MAC data frames.

Various embodiments may be designed to address different technical problems associated with communications of a direct MAC data frame. For instance, some embodiments may be designed to address one or more technical problems such as determining a direct MAC data frame. The technical problem of determining a direct MAC data frame may involve determining elements of the frame that can be shortened and in some embodiments, determining which elements of the header of the frame can be removed, truncated, or otherwise shortened to determine a shortened header. Other technical problems may involve identifying a direct MAC data frame.

Further embodiments may be designed to address one or more other technical problems such as communicating from the transmitting device to the receiving device that the packet being transmitted includes a direct MAC data frame. In several embodiments, the technical problem of communicating that the packet includes a direct MAC data frame may involve indicating to the physical layer (PHY) that the frame is a direct MAC data frame at the transmitting device and determining that a packet received includes a direct MAC data frame at the receiving device. Other technical problems may involve identifying that a packet comprises a direct MAC data frame, communicating to the medium access control sublayer that the packet comprises direct MAC data, and parsing and interpreting direct MAC data.

Technical problems such as one or more of the technical problems discussed above have not been known in the art until discovery and teaching represented by this disclosure. A lack of understanding of technical problems led to the failure of current art to conceive of, discuss, and describe the solutions such as the solutions described by this disclosure. In other words, the solutions presented herein were not obvious in the art due at least in part to a lack of knowledge of the technical problems by other persons of skill in the art.

Different technical problems such as those discussed above may be addressed by one or more different embodiments. For instance, some embodiments that are designed to address formats of the direct MAC data frame may do so by one or more different technical means such as maintaining formats for the direct MAC data frames or portions thereof in memory and including logic to utilize the direct MAC data in the MAC sublayer. Further embodiments that are designed to address the technical problem of communicating to the receiving device that the packet comprises a direct MAC data frame, may do so by one or more different technical means such as indicating to the PHY that a frame is a direct MAC data for insertion in the signal field of the preamble or determining by the PHY logic that the frame is a direct MAC data frame.

Still further embodiments that are designed to address the technical problem of communicating to the receiving device that the packet is a direct MAC data frame, may do so by one or more different technical means such as setting a bit in the preamble of the PHY protocol data unit (PPDU) to indicate that the packet comprises a direct MAC data frame. In many embodiments, the PHY logic may set a bit in the signal field of the preamble to indicate that the signal field comprises direct MAC data, which may be a MAC sublayer frame.

Further embodiments include one or more bits in the preamble of a direct MAC data frame to indicate that additional data is appended to the direct MAC data frame. The additional data may include tail bits such as six logical zeros.

Some embodiments include a normal PHY frame with a signal field designed to deliver information about the MAC sublayer features and/or the PHY features. In such embodiments, one or more bits in the signal field may be allocated or defined to deliver an indication to a PHY of another communications device that the packet does not comprise a direct MAC data frame. In some embodiments, the one or more bits indicating whether or not the packet comprises direct MAC data may be transmitted by rotating or shifting one or more symbols of the preamble of the packet.

Some embodiments implement a 1 Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet. According to one embodiment, the efficiency of the protocol may be improved by reducing the size of the packets with MAC sublayer frames, which can enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
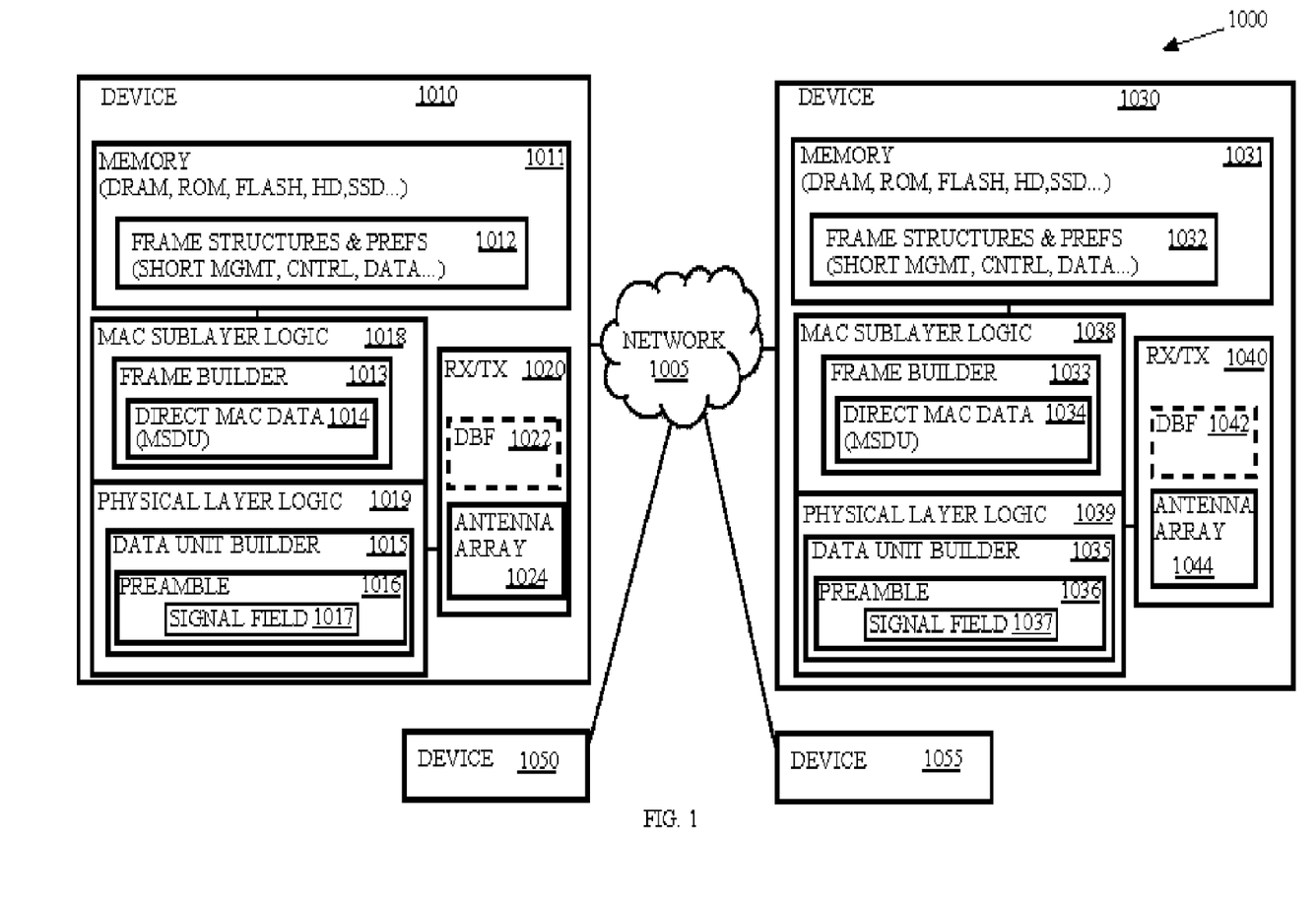
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

Initially, the communications device 1030 may determine a direct MAC data frame to transmit. For instance, a frame builder 1033 of communications device 1030 may generate or select a short frame based upon a short frame structure 1032 in memory 1031 of communications device 1030 to generate direct MAC data 1034 as a MAC service data unit. The short frames and short frame structures may be designed to comprise the amount of data that is transmitted in a normal PHY signal field of a preamble such as the normal PHY signal field 1208 illustrated in FIG. 1C. The MAC sublayer logic 1038 may communicate with the PHY logic 1039 to transmit the direct MAC data 1034 to the PHY logic 1039 and to indicate that the packet is a direct MAC data frame.

In response to receiving the indication that the packet is a direct MAC data frame, which may be received in the form of a bit for a signal field of a preamble, the data unit builder 1035 of the PHY logic 1039 may generate a preamble 1036 comprising an indication of the direct MAC data frame. In the present embodiment, the data unit builder 1035 may generate a signal field 1037 in the preamble with the bit indicating that the frame is a direct MAC data frame and insert the direct MAC data 1034 in the signal field without most or all of the elements typically included in the signal field such as the PHY data rate.

The direct MAC data 1014, 1034 may comprise a MAC sublayer frame with a short MAC header that is identified as a management, control, or data frame type and a particular management, control, or data frame subtype. In further embodiments, the frame type may be a different frame type such a new frame type defined with reserved field values. Thereafter, the communications device 1030 may transmit the direct MAC data 1034 such as an association request frame to associate with communications device 1010.

In many embodiments, the direct MAC data 1014, 1034 is a compressed frame designed to fit within the signal field of the preamble of the PHY frame. In some embodiments, additional data may be appended to the direct MAC data 1014, 1034. In such embodiments, the MAC sublayer logic 1018, 1038 may communicate with the PHY layer logic 1019, 1039 to indicate that additional direct MAC data is included. The PHY layer logic 1019, 1039 may, in response, set one or more bits in the preamble to indicate that the additional data is appended to the direct MAC data 1014, 1034 as well as include an indication of the length of the additional data that is appended to the frame so that the PHY logic 1019, 1039 at the receiving end of the transmission can determine that the packet is a direct MAC data frame that comprises the direct MAC data 1014, 1034 and the additional direct MAC data appended to the direct MAC data 1014, 1034.

The communications device 1010 may receive the direct MAC data frame in the form of a packet. The packet may comprise the direct MAC data 1014 and, in some embodiments, one or more additional frames with the preamble 1016. PHY logic 1019 may decode part of the signal field 1017 of the preamble 1016 to determine that the packet comprises a direct MAC data frame. In particular, the PHY logic 1019 may recognize one or more bits in the signal field 1017 or one or more rotated symbols in the preamble that identify the frame as a direct MAC data frame. The PHY logic 1019 may communicate with the MAC sublayer logic 1018 to indicate that the packet is a direct MAC data frame and to transmit the direct MAC data 1014 to the MAC sublayer logic 1018. In many embodiments, the PHY logic 1019 will parse a bit from the signal field 1017 that is set to a logical one if the packet is a direct MAC data frame and is set to a logical zero if the packet is a normal PHY frame with PHY elements in the signal field and, in some embodiments, a payload including an MAC protocol data unit (MPDU).

In further embodiments, if the bit indicates that the packet is a direct MAC data frame, the PITY logic 1019 may parse one or more additional bits from the signal field 1017 to determine whether or not additional direct MAC data is appended to the direct MAC data 1014. If so, the PHY logic 1019 may interpret the one or more additional bits in the signal field 1017 that indicate the additional direct MAC data is appended, communicate with the MAC sublayer logic 1018 to indicate that the packet comprises the additional direct MAC data, and to transmit the additional direct MAC data to the MAC sublayer logic 1018.

The MAC sublayer logic 1018 may parse the direct MAC data 1014 and the additional direct MAC data, if included, based upon a MAC frame structure 1012 in memory 1011. The MAC sublayer logic 1018 may thereafter interpret one or more field values to determine that the communications device 1030 is requesting association.

The communications device 1010 may transmit a management frame such as a short association response frame to associate the communications device 1030 with the communications device 1010. In particular, the MAC sublayer logic 1018 may generate a MAC sublayer frame as direct MAC data 1014 and communicate with the PHY logic 1019 to indicate that the packet to generate is a direct MAC data frame. The MAC sublayer logic 1018 may transmit the direct MAC data 1014 to the PHY logic 1019 and the PHY logic 1019 may generate the direct MAC data frame and transmit the packet to the communications device 1030.

Once the communications device 1030 associates with the communications device 1010, the communications device 1030 may periodically transmit data frames to the communications device 1010 as a direct MAC data frame. The communications device 1030 may also periodically receive beacon frames from the communications device 1010 of the metering substation to transmit data related to water usage.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

Figure 1A:
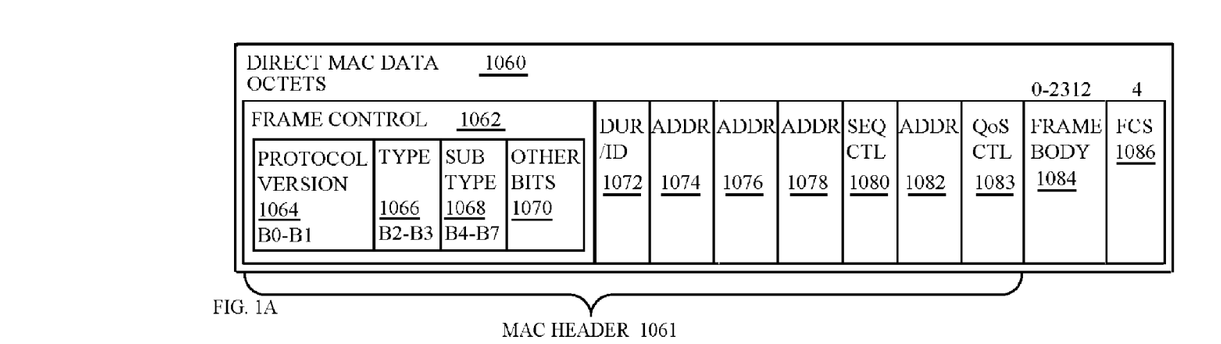
FIG. 1A depicts an embodiment of direct medium access control (MAC) data for establishing communications between wireless communication devices.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the direct MAC data 1014, 1034 and/or the frame structures of direct MAC data 1014, 1034. And the memory 1011 and 1031 may store frame headers such as short MAC headers or portions thereof to generate direct MAC data 1014, 1034. In many embodiments, the direct MAC data 1014, 1034 may comprise fields based upon the structure of the standard frame structures identified in IEEE 802.11. FIG. 1A illustrates an embodiment of a frame structure for direct MAC data 1014, 1034 that is the same as the standard frame structure with exception of one or more of the field sizes.

The direct MAC data 1014, 1034 frame structures may differ from the standard frame structures in the number or types of fields and/or the size of the fields included in the MAC header. For example, in direct MAC data 1014, 1034, one or more or even all of the fields in the header may be truncated or omitted. In several embodiments, at least the type field and the subtype field of the MAC header are the same size as the corresponding fields in the standard frame. In further embodiments, the protocol field is included and is the same size as the corresponding protocol field in the standard MAC header.

FIG. 1A illustrates a frame structure for direct MAC data 1060 that comprises all the fields of the standard frame although one or more of the fields in the direct MAC data 1060 frame structure are truncated or compressed. In the embodiment illustrated in FIG. 1A, the direct MAC data 1060 frame structure comprises a MAC header 1061 followed by a frame body field 1084 and a frame check sequence (FCS) field 1086. The frame body field 1084 may comprise one or more frames also referred to as MAC sublayer Service Data Units (MSDUs). The frame body 1084 may be a variable number of octets such as zero to 2312 octets like a frame body of a standard frame and may include data elements, control elements, or parameters and capabilities. The FCS field 1086 may be four octets such as the standard frame and may include extra checksum characters added to the short frame 1060 for error detection and correction.

The MAC header 1061 may comprise the frame control field 1062, a duration/identifier (DUR/ID) field 1066, an address (ADDR) field 1074, an ADDR field 1076, an ADDR field 1078, a Sequence Control (SEQ CTL) field 1080, an ADDR field 1082, and a quality of service control (QoS CTL) field 1083. The frame control field 1062 may be two octets such as the standard frame and may identify the type and subtype of the frame such as a control type and ready to send (RTS) subtype. One or more of the fields ADDR 1076, ADDR 1078, Sequence Control 1080, ADDR 1082, QoS control 1083, and frame body 1084 may only be present in certain frame types and subtypes of the direct MAC data 1060 frame structure as is the case for standard frames. In further embodiments, direct MAC data 1060 frame structures may comprise one or more other fields and/or one or more of these fields with a truncated or compressed format with respect to the fields of the corresponding standard frame.

The frame control field 1062 may comprise a protocol version field 1064, a type field 1066, a subtype field 1068, and other frame control bits 1070. The protocol version field 1064 may be two bits in length (B0-B1). The value of the protocol version field 1064 may represent the revision of the corresponding standard that the frame represents. The type field 1066 may be two bits in length (B2-B3) and may identify the type of direct MAC data 1060 as, e.g., a management frame, a data frame, or a control frame. The subtype field 1068 may be four bits in length (B4-B7) and may identify the subtype of the direct MAC data 1060 as, e.g., a particular type of management frame, data frame, or control frame. And after the subtype field 1068 may be other bits 1070, such as in a standard frame, which may be used for additional frame control field parameters.

The direct MAC data 1060 may comprise the same number of symbols as the symbols composing a normal PHY signal field. For example, there may currently be 52 bits in the signal field, which may allow, e.g., 45 bits for the MAC data in the direct MAC data. In addition, if 1 megahertz (MHz) transmissions use six-symbol signal fields, this may reduce the available space to 36 bits, which would comprise 29 bits in the direct MAC data at 1 MHz. Furthermore, in the event that the normal 1 MHz PHY signal field uses tail-biting, then the 1 MHz direct MAC data may also use tail-biting.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as direct MAC data management frames, data frames, and control frames, and may communicate with the PHY logic 1019, 1039 to indicate that these frames are the direct MAC data 1014, 1034. The PHY logic 1019, 1039 may generate PHY protocol data units (PPDUs) based upon the direct MAC data 1014, 1034 and may include an indication that the packet comprises the direct MAC data 1014, 1034 such as setting a bit in the signal field 1017, 1037 of the preamble 1016, 1036 to a logical one. More specifically, the frame builders 1013 and 1033 may generate the direct MAC data 1014, 1034 and the data unit builders 1015, 1035 of the PHY logic 1019, 1039 may generate a PHY frame with the direct MAC data 1014, 1034 in the signal fields 1017, 1037 of the preambles 1016, 1036 to generate PPDUs for transmission via a PHY device such as the transceivers (RX/TX) 1020 and 1040. In some embodiments, setting one bit in the signal field may indicate that the packet comprises one direct MAC data 1014, 1034 frame. In further embodiments, setting one bit in the signal field may indicate that the packet comprises more than one direct MAC data 1014, 1034 frames. For instance, additional frames of direct MAC data 1014, 1034 may be included in additional direct MAC data that is appended to the direct MAC data 1014, 1034. In such embodiments, the last direct MAC data symbol may include tails bits.

The direct MAC data 1014, 1034, also referred to as MAC layer Service Data Units (MSDUs), may comprise a management frame. For example, frame builder 1013 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 1B:
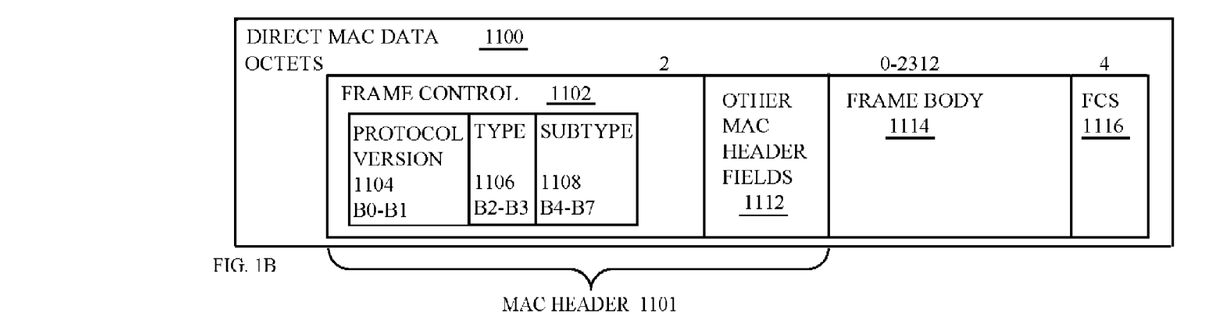
FIG. 1B depicts an alternative embodiment of direct MAC data for establishing communications between wireless communication devices.

FIG. 1B depicts an alternative embodiment of a direct MAC data 1100 for establishing communications between wireless communication devices. The direct MAC data 1100 may comprise a MAC header 1101, a frame body 1114, an FCS 1116. The MAC header 1101 may comprise a frame control field 1102 and other MAC header fields 1112. The frame control field 1102 may comprise a protocol version field 1104, a type field 1106, a subtype field 1108, and other frame control bits 1110. The protocol version field 1104 may be two bits in length (B0-B1) and may be invariant in size and in placement. The value of the protocol version field 1104 may represent the revision of the corresponding standard that the frame represents. In other words, the revision may indicate the structure of the "standard frame" discussed herein. The revision level will be incremented when a fundamental incompatibility exists between a new revision and the prior edition protocol version so MAC sublayer logic such as the MAC sublayer logic 1038 that receives a frame with a higher revision level than it supports shall discard the frame. Reception by the MAC sublayer logic such as the MAC sublayer logic 1038 of communications device 1030 implies that the frame contents are valid, and that the protocol version field 1104 value is supported, with no implication regarding frame addressing or regarding whether the frame type or other fields in the MAC header are meaningful to the MAC sublayer logic that has received the frame.

The type field 1106 may be two bits in length (B2-B3) and may identify the type of direct MAC data 1100 as, e.g., a management type, control type, data type, or, in some embodiments, one or more other defined types. The subtype field 1108 may be four bits in length (B4-B7) and may identify the subtype of the direct MAC data 1100 as, e.g., a beacon subtype, an acknowledgement subtype, a data subtype, or the like. After the subtype field 1108 may be more bits such as B8-B15 like a standard frame that may be used for additional frame control field parameters. Furthermore, the frame control field 1102 may be truncated by one or more bits. The MAC header 1101 may also comprise other MAC header fields 1110 and the direct MAC data 1100 may end with an FCS 1116. In many embodiments, the FCS 1116 may be sufficient check for the direct MAC data 1100 so the cyclic redundancy check (CRC) bits that are normally included in the signal field of the PHY frame may not be included in direct MAC data frames such as the direct MAC data frame illustrated in FIG. 1D.

Figure 1C:
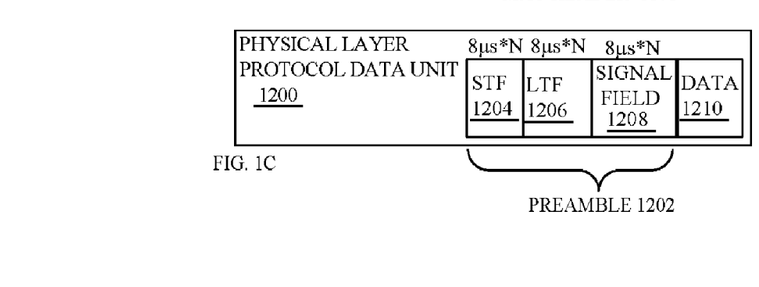
FIG. 1C depicts an embodiment of a preamble for a normal physical layer (PHY) frame with one or more bits to facilitate direct MAC data frames for establishing communications between wireless communication devices.

FIG. 1C depicts an embodiment of normal PHY frame, also referred to as a physical PHY protocol data unit (PPDU) 1200 with a preamble structure 1202 for establishing communications between wireless communication devices such as communications devices 1010, 1030, 1050, and 1055 in FIG. 1. The PPDU 1200 may comprise a preamble structure 1202 including orthogonal frequency division multiplexing (OFDM) training symbols for a single multiple input, multiple output (MIMO) stream followed by a signal field 1208 and the preamble structure 1200 may be followed by the data payload. In further embodiments, the signal field 1208 may be followed by additional OFDM training symbols for additional MIMO streams.

The PPDU 1200 may comprise a short training field (STF) 1204, a long training field (LTF) 1206, the signal field 1208, and data 1210. Note that the timing discussed in the following paragraphs provide are for some specific embodiments for illustrative purposes. Other embodiments may comprise times that are 10 times longer with a base channel that is 10 times shorter. Still other embodiments may provide different timings and base channels.

The STF 1204 may comprise a number of short training symbols such as 10 short training symbols that are 0.8 microseconds (μs) times N in length, wherein N is an integer representing the down-clocking factor from a 20 MHz channel spacing. For instance, the timing would double for 10 MHz channel spacing. The total time frame for the STF 1204 at a 20 MHz channel spacing is 8 us times N.

The LTF 1206 may comprise a guard interval (GI) symbol and two long training symbols. The guard interval symbol may have a duration of 1.6 us times N and each of the long training symbols may have durations of 3.2 us times N at the 20 MHz channel spacing. The total time frame for the LTF 1206 at a 20 MHz channel spacing is 8 us times N.

The signal field 1208 may comprise a GI symbol at 0.8 μs times N and signal field symbols at 7.2 μs times N. One or more symbols in the signal field 1208 may comprise a bit defined to indicate whether or not the frame comprises direct MAC data such as direct MAC data 1060 illustrated in FIG. 1A or direct MAC data 1100 illustrated in FIG. 1B. In the present embodiment, the PPDU 1200 is a normal PHY frame so the signal field 1208 does not comprise direct MAC data and the bit defined to indicate whether or not the frame comprises direct MAC data may be set to, e.g., a logical zero, to indicate that the PPDU 1200 is a normal PHY frame.

The data 1210 may comprise one or more MAC sublayer protocol data units (MPDUs) and may include one or more GIs. For example, the data 1210 may comprise one or more sets of symbols including a GI symbol at 0.8 μs times N at the 20 MHz channel spacing followed by payload data at 3.2 μs times N at the 20 MHz channel spacing.

Figure 1D:
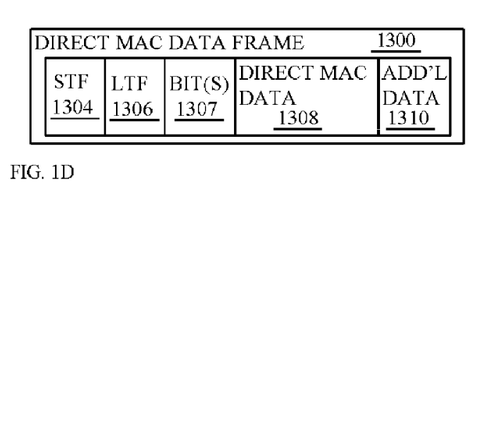
FIG. 1D depicts an embodiment of a direct MAC data frame for establishing communications between wireless communication devices.

FIG. 1D depicts an embodiment of a direct MAC data frame 1300, also referred to as a physical layer protocol data unit (PPDU), which is a preamble with the optional additional direct MAC data 1310 appended for establishing communications between wireless communication devices such as communications devices 1010, 1030, 1050, and 1055 in FIG. 1. The direct MAC data frame 1300 may comprise a preamble structure including orthogonal frequency division multiplexing (OFDM) training symbols for a single multiple input, multiple output (MIMO) stream followed by a signal field 1308 and the preamble structure may be followed by the additional data 1310. In further embodiments, the signal field 1308 may be followed by additional OFDM training symbols for additional MIMO streams.

The direct MAC data frame 1300 may comprise a short training field (STF) 1304, a long training field (LTF) 1306, the signal field 1308, and the additional data 1310. The STF 1304 may comprise a number of short training symbols such as 10 short training symbols that are 0.8 microseconds (μs) times N in length, wherein N is an integer representing the down-clocking factor from a 20 MHz channel spacing. The timing may double for 10 MHz channel spacing and the total time frame for the STF 1304 at a 20 MHz channel spacing may be 8 μs times N.

The LTF 1306 may comprise a guard interval (GI) symbol and two long training symbols. The guard interval symbol may have a duration of 1.6 μs times N and each of the long training symbols may have durations of 3.2 μs times N at the 20 MHz channel spacing. The total time frame for the LTF 1306 at a 20 MHz channel spacing is 8 μs times N. In some embodiments the STF 1304 and/or the LTF 1306 may comprise symbols that are rotated to indicate bits 1307 of data and/or that the packet comprises a direct MAC data frame 1300.

The signal field 1308 may comprise a GI symbol at 0.8 μs times N and signal field symbols at 7.2 μs times N. In the present embodiment, one or more symbols in the signal field 1308 may comprise a bit 1307 defined to indicate whether or not the frame comprises direct MAC data 1308. The direct MAC data frame 1300 is not a normal PHY frame so the signal field 1308 comprises direct MAC data 1308 and the bit 1307 defined to indicate whether or not the frame comprises direct MAC data may be set to, e.g., a logical one to indicate that the direct MAC data frame 1300 is a direct MAC data frame.

The signal field may also include one or more bits 1307 to indicate whether or not the frame comprises additional direct MAC data 1310 and, for embodiments that comprise the additional direct MAC data 1310, the one or more bits 1307 may comprise a length of the additional direct MAC data 1310. In some embodiments, the one or more bits 1307 may indicate that the additional direct MAC data 1310 is appended by indicating a length of the additional direct MAC data 1310 that is greater than zero and may indicate that the additional direct MAC data 1310 is not appended by indicating a length for the additional direct MAC data 1310 of zero or null. In other embodiments, the length of the additional direct MAC data 1310 may reside in the additional direct MAC data 1310.

In some embodiments, the additional direct MAC data 1310 may comprise additional data for the direct MAC data 1308. In further embodiments, the additional direct MAC data 1310 may comprise additional frames from the MAC sublayer logic such as additional frames similar to the direct MAC data 1060 illustrated in FIG. 1A and/or the direct MAC data 1100 illustrated in FIG. 1B.

In other embodiments, the signal field 1208, 1308 may not include one or more bits in a distinct field to indicate whether or not the frame comprises direct MAC data 1308. In such embodiments, one or more symbols of the STF 1204, LTF 1206, or the signal field 1208 and the STF 1304, LTF 1306, or the signal field 1308 may have one or more rotated symbols by, e.g., 180 degrees, to indicate whether or not direct MAC data is included in the frame.

In alternative embodiments, the direct MAC data 1308 field may comprise more symbols than the signal field 1208 of the normal PHY frame. For instance, for 2 MHz and above, the direct MAC data frame may comprise one extra symbol and for 1 MHz, the direct MAC data frame may comprise seven extra symbols to allow 65 bits of direct MAC data to be included in the signal field of the PPDU.

Figure 2:
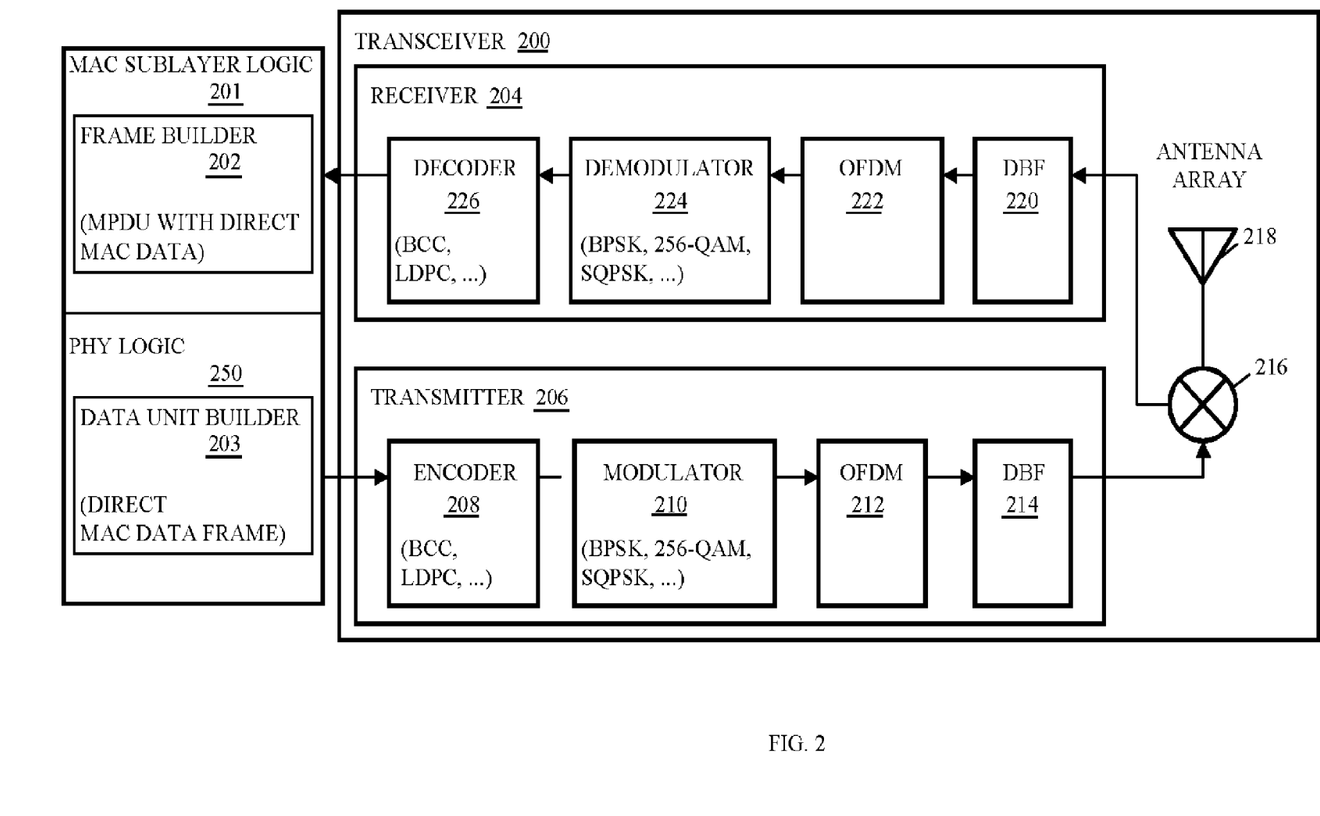
FIG. 2 depicts an embodiment of an apparatus to generate, transmit, receive and interpret a direct MAC data frame.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine direct MAC data and transmit an indication that the frame is direct MAC data to the physical layer (PHY) logic 250. The PHY logic 250 may determine the PPDU by determining a preamble with a bit set to indicate that the signal field comprises direct MAC data and generating the frame with a preamble to transmit via transceiver 200.

In other embodiments, the MAC sublayer logic 201 may determine an MPDU frame and transmit an indication that the MPDU is for a normal PHY frame to the PHY logic 250. The PHY logic 250 may determine the PPDU by determining a preamble with a bit set to indicate that the signal field does not comprise direct MAC data and encapsulating the frame with a preamble to transmit via transceiver 200.

In many embodiments, the MAC sublayer logic 201 may comprise a frame builder 202 to generate frames (MPDU) such as the direct MAC data illustrated in FIGS. 1A-B. The direct MAC data may comprise fields that are truncated/compressed or omitted with respect to a standard frame. For instance, a truncated/compressed field may comprise less bits than a corresponding field in a standard frame because some bits of the field were not being used for the frame, the information relevant to the direct MAC data can be conveyed with less bits, or the information represented by the removed bits is not being transmitted with the frame.

The direct MAC data formats, field values, and/or the direct MAC data may be maintained by an access point such as communications device 1010 and a station such as communications device 1030 in FIG. 1 in memory 1012, 1032. For example, in some embodiments, a frame builder 202 may generate direct MAC data with a short MAC header defined in memory of the communications device and the MAC sublayer logic 201 may transmit an indication that the frame is direct MAC data to the PHY logic 250. In some embodiments, the indication may comprise a field value for the preamble of the PPDU that includes a bit that is set to indicate that a frame in the PPDU is direct MAC data. In other embodiments, the MAC sublayer logic 201 may transmit an indication such as a signal to the PHY logic 250 and the PHY logic 250 may set a bit in the preamble in response to the signal to indicate that a frame in the PPDU is direct MAC data.

The PHY logic 250 may comprise a data unit builder 203. The data unit builder 203 may determine a preamble with the bit set to indicate that the frame is direct MAC data and the PHY logic 250 may insert the MPDU in the signal field of the preamble in lieu of other signal field elements included in the normal PHY frame to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal subcarriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

In some embodiments, the receiver 204 may determine that a bit indicative of direct MAC data is set and may transmit an indication of the direct MAC data to the MAC sublayer logic 201. In further embodiments, the receiver 201 may transmit one or more bits included in the preamble of the packet received to the MAC sublayer 201 and the one or more bits may include an indication that a frame in the MPDU is direct MAC data.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

The MAC sublayer logic 201 may parse the MPDU based upon a format defined in the communications device for direct MAC data to determine the particular type of frame by determining the type value and the subtype value. The MAC sublayer logic 201 may then parse and interpret the remainder of MPDU based upon the definition for the direct MAC data of the particular type and subtype indicated in the MAC header. For instance, if the direct MAC data is a management frame, the frame body may include parameters to set for communication preferences for the source station of the transmission. In some embodiments, the frame body may include information related to traffic preferences such as traffic for which the source station requests that the access point respond on behalf of the source station.

Figure 3A:
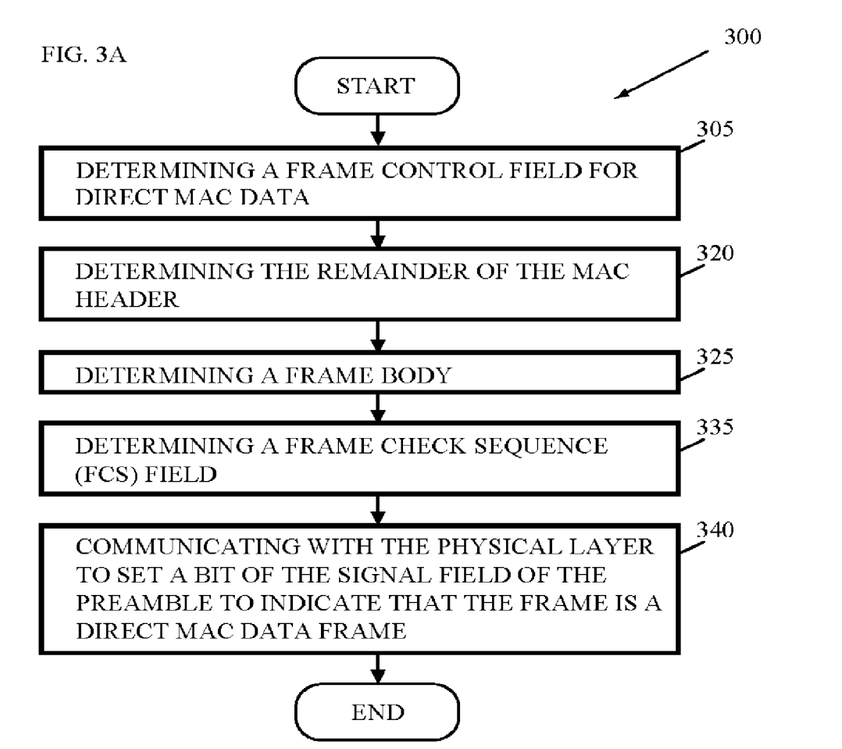
FIGS. 3A-B depict embodiments of flowcharts to generate a direct MAC data, generate a preamble for a direct. MAC data frame, communicate an identification of the direct MAC data frame, and parse and interpret the direct MAC data frame.
Figure 3B:
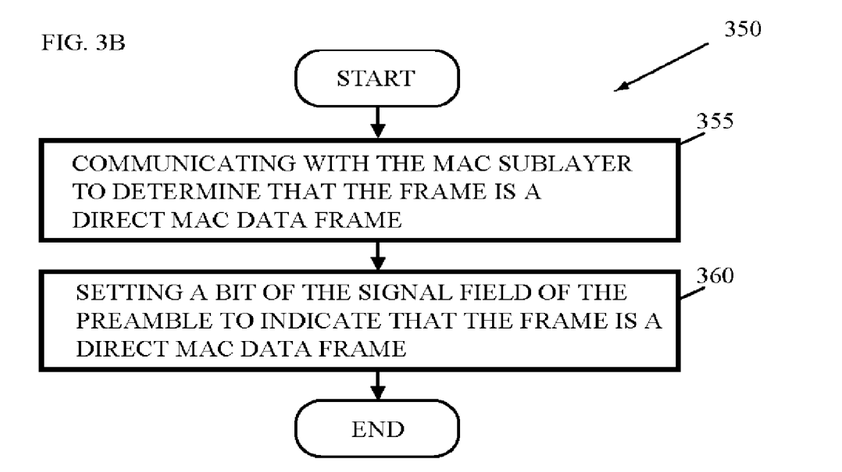

FIGS. 3A-B depict embodiments of flowcharts to generate direct MAC data, generate a preamble with the direct MAC data in the signal field, transmit the direct MAC data frame between communications devices, indicate that the frame is a direct MAC data frame via communication between MAC sublayer logic and PHY logic, and parse and interpret the direct MAC data. In particular, FIG. 3A depicts an embodiment of a flowchart 300 to generate or otherwise determine direct MAC data. The flowchart 300 begins with a medium access control (MAC) sublayer logic determining a frame control field for direct MAC data (element 305). In some embodiments, the MAC sublayer logic may determine a protocol version field to be the current revision of the standard, a type being a management frame such as a value of 00, a subtype being a beacon such as a value of 1000.

In some embodiments, the MAC sublayer logic may determine one or more truncated values such as a truncated duration value by, e.g., utilizing a duration time unit that is greater than one microsecond. In further embodiments, the MAC sublayer logic may determine an association identifier (AID) by, e.g., hashing the AID or otherwise compressing the AID in a manner that can be decoded by the receiving communications device.

The MAC sublayer logic may determine the remainder of the direct MAC data (element 320). For example, the MAC sublayer logic may generate the remainder of the frame control field and the remainder of the MAC header such as a power management field value, a protected frame field value, an order field value, a more data field value, and/or the like.

The MAC sublayer logic may determine the frame body (element 325). In many embodiments, determining the fields may comprise retrieving these fields from a storage medium such as memory 1012 illustrated in FIG. 1 for inclusion in direct MAC data. In other embodiments, the values to include in such fields may be stored in a storage medium such as a read only memory, random access memory, a cache, a buffer, a register, or the like. In further embodiments, one or more of the fields may be hardcoded into the MAC sublayer logic, PHY logic, or may otherwise be available for insertion into a direct MAC data frame. In still other embodiments, the MAC sublayer logic may generate the values of the fields of the direct MAC data based upon access to indications of the values for each.

After determining the other portions of the direct MAC data, the MAC sublayer logic may determine a frame check sequence (FCS) field value (element 335) to provide for error corrections at the access point.

Either before, during, or after the MAC sublayer logic may determine the direct MAC data, the MAC sublayer logic may also communicate with the PHY logic to set a bit in a signal field of the preamble to indicate that the frame encapsulated by the preamble is direct MAC data (element 340). In some embodiments, the MAC sublayer logic may transmit a field value to the PHY logic to indicate that the frame is direct MAC data. In many embodiments, the MAC sublayer logic may transmit the field value comprising an indication of whether or not additional direct MAC data is appended to the direct MAC data. In other embodiments, the PHY logic may respond to an indication from the MAC sublayer logic that the frame is direct MAC data by setting one or more bits in the signal field. In further embodiments, another bit in the preamble may be used to indicate that the frame is direct MAC data or one or more symbols of the preamble may be rotated or shifted to indicate that the frame is direct MAC data.

FIG. 3B depicts an embodiment of a flowchart 300 to generate or otherwise determine direct MAC data. The flowchart 300 begins with a PHY logic communicating with a MAC sublayer logic to determine that a frame from the MAC sublayer logic is that the frame is a direct MAC data frame (element 355). The PHY logic may responsively set a bit in the signal field of the preamble to indicate that the frame is a direct MAC data frame (element 360).

Figure 4A:
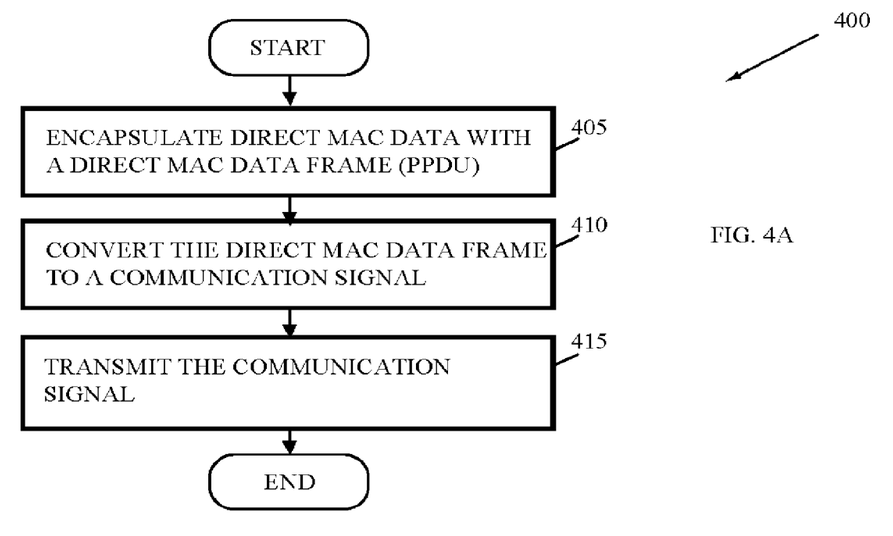
FIGS. 4A-B depict embodiments of flowcharts to transmit, receive, and interpret communications with direct MAC data frames as illustrated in FIG. 2.
Figure 4B:
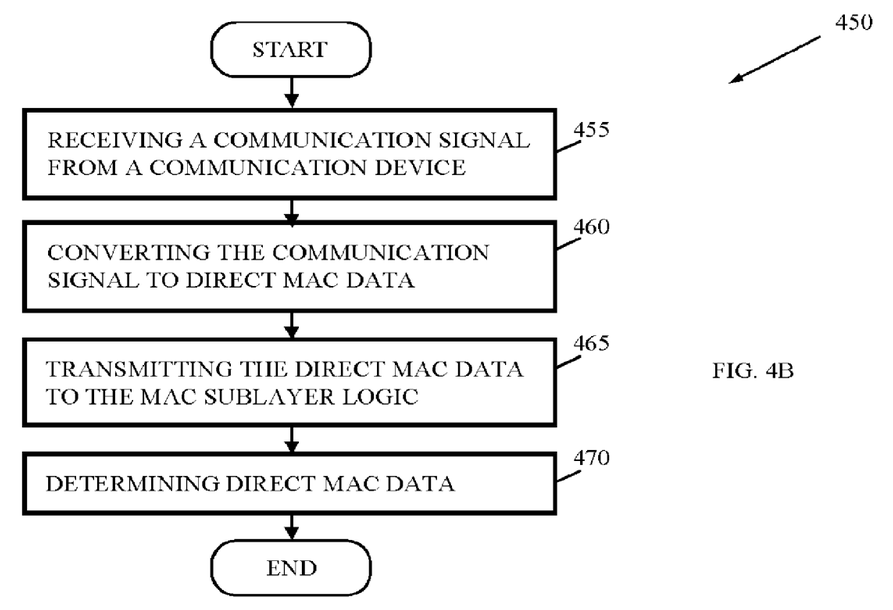

FIGS. 4A-B depict embodiments of flowcharts 400 and 450 to transmit, receive, and interpret communications with direct MAC data such as the direct MAC data illustrated in FIGS. 1A-C. Referring to FIG. 4A, the flowchart 400 may begin with receiving a frame from the frame builder and communicating with the MAC sublayer logic to determine a preamble with a bit indicative of the frame being direct MAC data. The MAC sublayer logic of the communications device may generate the direct MAC data as a management frame to transmit to an access point and may pass the direct MAC data as an MAC protocol data unit (MPDU) to a data unit builder that transforms the direct MAC data into a packet that can be transmitted to the access point. The data unit builder may generate a preamble with the direct MAC data in the signal field to form a PHY protocol data unit (PPDU) for transmission (element 405). In some embodiments, additional direct MAC data may be appended to the direct MAC data in a PPDU. Such embodiments may include one or more bits, rotated symbols, or the like to indicate the additional direct MAC data as well as the length of the additional direct MAC data. Other embodiments may include bits to indicate whether or not the additional direct MAC data comprises additional MAC sublayer frames.

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of an access point such as the receiver 204 in FIG. 2 receiving a communication signal via one or more antenna(s) such as an antenna element of antenna array 218 (element 455). The receiver may convert the communication signal into an MPDU in accordance with the process described in the preamble or a default process (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU, such as direct MAC data, to MAC sublayer logic such as MAC sublayer logic 202 (element 465). The PHY logic may also communicate with the MAC sublayer logic to indicate that the MPDU comprises direct MAC data.

The MAC sublayer logic may determine direct. MAC data field values from the MPDU (element 470) such as the direct MAC data 1060 fields or the direct MAC data 1100 fields in FIGS. 1A-B. For instance, the MAC sublayer logic may determine direct MAC data field values such as the type and subtype field values of the direct MAC data.

The following examples pertain to further embodiments. One example comprises a method. The method may involve generating, by a medium access control sublayer logic, data for a signal field of a preamble in accordance with a frame structure of a medium access control sublayer; communicating, by the medium access control sublayer logic with physical layer logic, an indication that the data is for the direct medium access control data frame; generating, by the physical layer logic, the preamble with the data in the signal field in response to the indication that the data is for the direct medium access control data frame to form the packet; and setting, by the physical layer logic, a bit in a preamble, in response to the indication, the bit being defined to indicate that the packet is the direct medium access control data frame.

In some embodiments, the method may further comprise transmitting, by the antenna, the frame encapsulated by the preamble. The method may further comprise storing, by the medium access control sublayer logic, at least part of the frame in memory. In further embodiments of the method, the method may further comprise generating, by the medium access control sublayer logic, additional data to append to the preamble; communicating, by the medium access control sublayer logic with the physical layer logic, an indication that the additional data is appended to the data and a length of the additional data; and setting, by the physical layer logic, a bit in a preamble, in response to the indication, the bit being defined to indicate that the packet comprises additional data appended to the preamble. In some embodiments of the method, generating the additional data comprises generating the additional data with tail bits. In some embodiments of the method, generating the data comprises generating the data as a medium access control sublayer frame sized to fit in the signal field of the preamble. And, in some embodiments of the method, setting the bit comprises setting one or more bits in the preamble to indicate a length of the additional data.

At least one computer program product for communication of a packet with a short frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control sublayer logic to generate data for a signal field of a preamble and to communicate with physical layer logic, an indication that the data is for the direct medium access control data frame; and the physical layer logic to generate the preamble with the data in the signal field in response to the indication that the data is for the direct medium access control data frame to form the packet, and to set a bit in a preamble, in response to the indication, the bit being defined to indicate that the packet is the direct medium access control data frame.

In some embodiments, the apparatus may further comprise an antenna to transmit the PHY frame with direct MAC data. In some embodiments, the apparatus may further comprise memory to store at least part of the frame. In further embodiments of the apparatus, the medium access control sublayer logic comprises logic to generate additional data to append to the preamble; the medium access control sublayer logic comprises logic to communicate with the physical layer logic, an indication that the additional data is appended to the data; and the physical layer logic comprises logic to set a bit in a preamble, in response to the indication, the bit being defined to indicate that the packet comprises additional data appended to the preamble. In some embodiments of the apparatus, the medium access control sublayer logic comprises logic to generate the additional data comprises generating the additional data with tail bits. In some embodiments of the apparatus, the medium access control sublayer logic comprises logic to generate the data in a medium access control sublayer frame structure sized to fit in the signal field of the preamble. In some embodiments of the apparatus, the physical layer logic comprises logic to set the bit in a signal field of the preamble.

Another example comprises a system. The system may comprise a medium access control sublayer logic to generate data for a signal field of a preamble and to communicate with physical layer logic, an indication that the data is for the direct medium access control data frame; and the physical layer logic to generate the preamble with the data in the signal field in response to the indication that the data is for the direct medium access control data frame to form the packet, and to set a bit in a preamble, in response to the indication, the bit being defined to indicate that the packet is the direct medium access control data frame; and an antenna coupled with the physical layer logic to transmit the packet.

In some embodiments, the system may further comprise memory to store at least part of the frame. In further embodiments of the system, the medium access control sublayer logic comprises logic to generate additional data to append to the preamble; the medium access control sublayer logic comprises logic to communicate with the physical layer logic, an indication that the additional data is appended to the data; and the physical layer logic comprises logic to set a bit in a preamble, in response to the indication, the bit being defined to indicate that the packet comprises additional data appended to the preamble. In further embodiments of the system, the medium access control sublayer logic comprises logic to generate the additional data comprises generating the additional data with tail bits. In some embodiments of the system, the physical layer logic comprises logic to set the bit in a signal field of the preamble.

The following examples pertain to further embodiments. One example comprises a method. The method may involve receiving, by a physical layer logic, a packet comprising a medium access control sublayer frame in a signal field of a preamble; determining, by physical layer logic, based upon a bit in the preamble, an indication that the frame is the direct medium access control data frame; communicating, by the physical layer logic with the medium access control sublayer logic, that the frame is the direct medium access control data frame and the data from the signal field; determining, by the medium access control sublayer logic, based upon the communication from the physical layer logic, the frame structure of the data from the signal field to parse and interpret the data.

In some embodiments, the method may further comprise receiving, by an antenna, the frame with direct medium access control data in the preamble. The method may further comprise storing, by the medium access control sublayer logic, at least part of the data from the signal field in memory. In further embodiments of the method, determining an indication that the packet comprises additional data appended to the data in the signal field of the preamble and the length of the additional data. In some embodiments of the method, determining based upon the bit in the preamble comprises interpreting the bit from the signal field of the preamble. And, in some embodiments of the method, communicating an indication that the frame is the direct medium access control data frame comprises communicating the bit from the preamble.

At least one computer program product for communication of a packet with direct medium access control data, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a physical layer logic to receive a packet comprising a medium access control sublayer frame in a signal field of a preamble, to determine based upon a bit in the preamble an indication that the frame is the direct medium access control data frame, and to communicate with the medium access control sublayer logic, the data from the signal field and that the frame is the direct medium access control data frame; and a medium access control sublayer logic to receive the data from the signal field and to determine based upon the communication from the physical layer logic, the frame structure of the data from the signal field.

In some embodiments, the apparatus may further comprise an antenna to receive the frame with the direct medium access control data in the preamble. In some embodiments, the apparatus may further comprise memory to store at least part of the frame. In further embodiments of the apparatus, the physical layer logic comprises logic comprises logic to determine an indication that the packet comprises additional data appended to the data in the signal field of the preamble and the length of the additional data. In some embodiments of the apparatus, the physical layer logic comprises logic to communicate the bit in a signal field of the preamble to the medium access control sublayer logic.

Another example comprises a system. The system may comprise a physical layer logic to receive a packet comprising a medium access control sublayer frame in a signal field of a preamble, to determine based upon a bit in the preamble, an indication that the packet comprises the direct medium access control data frame, and to communicate with the medium access control sublayer logic, that the packet comprises the direct medium access control data frame; and a medium access control sublayer logic to receive the data from the signal field and to determine based upon the communication from the physical layer logic, the frame structure of the data from the signal field; and an antenna coupled with the physical layer logic to transmit the frame.

In some embodiments, the system may further comprise memory to store at least part of the frame. In some embodiments of the system, the physical layer logic comprises logic to determine an indication that the packet comprises additional data appended to the data in the signal field of the preamble and the length of the additional data.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dip switch or the like. Still further features may be selected by a user after via a selectable preference such as a software preference, a dip switch, or the like.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method for communication of a packet with a direct medium access control (MAC) data frame, the method comprising:
   generating, by a MAC logic, data for a signal field of a preamble in accordance with a frame structure of a MAC;
   communicating, by the MAC logic with a physical layer (PHY) device, an indication that the data is for the direct MAC frame;
   generating, by the PHY device, the preamble with the data in the signal field in response to the indication that the data is for the direct MAC data frame to form the packet; and
   setting, by the PHY device, a bit in a preamble, in response to the indication, the bit being defined to indicate that the packet is the direct MAC data frame.

2. The method of claim 1, further comprising:
   generating, by the MAC logic, additional data to append to the preamble;
   communicating, by the MAC logic with the PHY device, an indication that the additional data is appended to the data and a length of the additional data; and
   setting, by the PHY device, a bit in a preamble, in response to the indication, the bit being defined to indicate that the packet comprises additional data appended to the preamble.

3. The method of claim 1, wherein generating the additional data comprises generating the additional data with tail bits.

4. The method of claim 1, wherein generating the data comprises generating the data as a MAC frame sized to fit in the signal field of the preamble.

5. The method of claim 1, wherein setting the bit comprises setting one or more bits in the preamble to indicate a length of the additional data.

6. An apparatus for communication of a packet with a direct medium access control (MAC) data frame, the apparatus comprising:
   a MAC logic to generate data for a signal field of a preamble and to communicate with a physical layer (PHY) device, an indication that the data is for the direct MAC data frame; and
   the PHY device to generate the preamble with the data in the signal field in response to the indication that the data is for the direct MAC frame to form the packet, and to set a bit in a preamble, in response to the indication, the bit being defined to indicate that the packet is the direct MAC data frame.

7. The apparatus of claim 6, wherein:
   the MAC logic comprises logic to generate additional data to append to the preamble;
   the MAC logic comprises logic to communicate with the PHY device, an indication that the additional data is appended to the data; and
   the PHY device comprises logic to set a bit in a preamble, in response to the indication, the bit being defined to indicate that the packet comprises additional data appended to the preamble.

8. The apparatus of claim 7, wherein the MAC logic comprises logic to generate the additional data comprises generating the additional data with tail bits.

9. The apparatus of claim 6, wherein the MAC logic comprises logic to generate the data in a MAC frame structure sized to fit in the signal field of the preamble.

10. The apparatus of claim 6, wherein the PHY device comprises logic to set the bit in a signal field of the preamble.

11. A system for communication of a packet with a direct medium access control (MAC) data frame, the system comprising:
- a MAC logic to generate data for a signal field of a preamble and to communicate with a physical layer (PHY) device, an indication that the data is for the direct MAC data frame; and
- the PHY device to generate the preamble with the data in the signal field in response to the indication that the data is for the direct MAC data frame to form the packet, and to set a bit in a preamble, in response to the indication, the bit being defined to indicate that the packet is the direct MAC data frame; and
- an antenna coupled with the PHY device to transmit the packet.

12. The system of claim 11, wherein:
- the MAC logic comprises logic to generate additional data to append to the preamble;
- the MAC logic comprises logic to communicate with the PHY device, an indication that the additional data is appended to the data; and
- the PHY device comprises logic to set a bit in a preamble, in response to the indication, the bit being defined to indicate that the packet comprises additional data appended to the preamble.

13. The system of claim 11, wherein the MAC logic comprises logic to generate the additional data comprises generating the additional data with tail bits.

14. The system of claim 11, wherein the PHY device comprises logic to set the bit in a signal field of the preamble.

15. A method for communication of a packet with a direct medium access control (MAC) data frame, the method comprising:
- receiving, by a physical layer (PHY) device, a packet comprising a MAC frame in a signal field of a preamble;
- determining, by PHY device, based upon a bit in the preamble, an indication that the frame is the direct MAC data frame;
- communicating, by the PHY device with the MAC logic, that the frame is the direct MAC data frame and the data from the signal field;
- determining, by the MAC logic, based upon the communication from the PHY device, the frame structure of the data from the signal field to parse and interpret the data.

16. The method of claim 15, further comprising determining an indication that the packet comprises additional data appended to the data in the signal field of the preamble and the length of the additional data.

17. The method of claim 15, wherein determining based upon the bit in the preamble comprises interpreting the bit from the signal field of the preamble.

18. The method of claim 15, wherein communicating an indication that the frame is the direct MAC data frame comprises communicating the bit from the preamble.

19. An apparatus for communication of a packet with a direct medium access control (MAC) data frame, the apparatus comprising:
- a physical layer (PHY) device to receive a packet comprising a MAC frame in a signal field of a preamble, to determine based upon a bit in the preamble an indication that the frame is the direct MAC data frame, and to communicate with the MAC logic, the data from the signal field and that the frame is the direct MAC data frame; and
- a MAC logic to receive the data from the signal field and to determine based upon the communication from the PHY device, the frame structure of the data from the signal field.

20. The apparatus of claim 19, wherein the PHY device comprises logic comprises logic to determine an indication that the packet comprises additional data appended to the data in the signal field of the preamble and the length of the additional data.

21. The apparatus of claim 19, wherein the PHY device comprises logic to communicate the bit in a signal field of the preamble to the MAC logic.

22. A system for communication of a packet with a direct medium access control (MAC) data frame, the system comprising:
- a physical layer (PHY) device to receive a packet comprising a MAC frame in a signal field of a preamble, to determine based upon a bit in the preamble, an indication that the packet comprises the direct MAC data frame, and to communicate with the MAC logic, that the packet comprises the direct MAC data frame; and
- a MAC logic to receive the data from the signal field and to determine based upon the communication from the PHY device, the frame structure of the data from the signal field; and
- an antenna coupled with the PHY device to transmit the frame.

23. The system of claim 22, wherein the PHY device comprises logic to determine an indication that the packet comprises additional data appended to the data in the signal field of the preamble and the length of the additional data.

* * * * *